United States Patent [19]

Vinz

[11] 4,202,319
[45] May 13, 1980

[54] BUILDING ROOF WITH SOLAR COLLECTOR

[76] Inventor: Siegfried Vinz, Neuwiesenrebenstr. 44, D-7505 Ettlingen, Fed. Rep. of Germany

[21] Appl. No.: 835,963

[22] Filed: Sep. 23, 1977

[30] Foreign Application Priority Data

Sep. 23, 1976 [DE] Fed. Rep. of Germany ....... 2642732

[51] Int. Cl.² .................................................. F24J 3/02
[52] U.S. Cl. ............................ 126/432; 165/48 S; 126/417
[58] Field of Search ............... 126/270, 271; 237/1 A; 136/89 PC; 52/549, 551, 552, 553; 165/48 S, 49, 53, 56

[56] References Cited

U.S. PATENT DOCUMENTS

| | | | |
|---|---|---|---|
| 801,736 | 10/1905 | Miksch | 52/552 |
| 907,824 | 12/1908 | Latulip | 52/552 X |
| 1,024,322 | 4/1912 | Firoben | 52/552 X |
| 3,434,260 | 3/1969 | Carter | 52/551 X |
| 4,023,321 | 5/1977 | Smith | 52/553 X |
| 4,083,360 | 4/1978 | Courvoisier et al. | 126/271 |
| 4,146,014 | 3/1979 | Allegro | 126/271 |

FOREIGN PATENT DOCUMENTS 905760  9/1962  United Kingdom ..................... 126/271

Primary Examiner—Carroll B. Dority, Jr.
Assistant Examiner—Larry Jones
Attorney, Agent, or Firm—Craig and Antonelli

[57] ABSTRACT

A roof or wall structure comprises a support framework including battens or the like and a plurality of tile-like solar heat collectors mounted thereon. The solar heat collectors have respective cavities therein within which respective heater coils or the like are disposed. The heater coils have inlets and outlets which are in fluid-flow connection with channels in the battens.

17 Claims, 7 Drawing Figures

BUILDING ROOF WITH SOLAR COLLECTOR

The invention concerns a building roof, comprising a supporting sub-structure having roof battens applied thereto for the mounting of roof tiles, such tiles being constructed as solar collectors which have a cavity traversed by a heat carrier and also an inlet and outlet for the heat carrier.

Besides the known large surface solar collectors for building walls and roofs, which are frequently inconvenient and which influence the outer features of a building to the detriment of the standard customary architecture, proposals have also been made, based on a customary sloping roof construction with roof tiles, whereby the roof tiles correspond superficially to the usual roofing tile. With a known construction such as proposed in Offenlegungsschrift 26 07 740 at least a part of the roofing tiling consists of transparent material under which a usually flat collector is arranged in the form of a rectangular box. Several such flat collectors are distributed over the roof surface and arranged within the angle of the roof slope. The transparent upper side of the flat collector is provided with parallel ledges which are in alignment with the uninterrupted roof battens at this point, thus replace these in the area of the collector. The roof tiles, which are also of transparent material, are constructed in the usual form where the roof can be covered also in the customary way. This construction is naturally very wasteful and the efficiency is bad since too much radiation power is diffused and lost between the roof tile and solar collector.

With regard to another more favourable solution to the utilization of solar energy, in Gebrauchsmuster 75 20 739 the roof tiles themselves are constructed as solar collectors and carry a heat carrier medium. Each roof tile has, in the area of its open rim, on the upper side, an opening defining an inlet, and, in the area of its lower rim and on the underside, a nipple defining an outlet, the nipple being engageable with the opening of the next lower-lying roof tile. The high constructed roof tiles are thus joined from above to below in a descending line, so that the heat carrier medium fed in at the top in the area of the gable, flows through the roof tiles downwards and can be collected again in the lower roof ridge.

This form of construction is satisfactory, of course, in an architectural but not a technical function. The roof tiles from top to bottom in sufficient rows are firmly connected with each other. Because of the strong thermal stresses, however, each roof tile must possess a possibility of expansion in all directions. As this expansion capability is not present, the roof tile necessarily bulges out, which again leads to damage to the collector seals and to the connections between the roof tiles. Moreover this construction is naturally only effective to some extent with south-facing roof surfaces.

The invention proceeds from a building roof having solar collectors of the last mentioned type wherein, on the one hand, thermal stresses which lead to damage to the roof tiles are avoided, and, on the other hand, an optimum utilization of the radiant solar energy is possible, and, of course, is not dependent on the position of the roof in regard to the position of the sun.

Proceeding from a roof construction of the previously described structure, according to the invention, this proposition is thereby resolved that each roof batten has two channels running parallel to the inlets, and outlets respectively of the heat carriers of the roof tiles and each roof tile has, in its supporting area on the roof batten, inlets and outlets for the heat carriers which are closely joined with the channels of the roof battens.

Each roof tile is, consequently, fixed only in its supporting area of the roof batten, while it can be freely extended in the direction of the opposite area. It is also suspended as in the case of the customary roof tiles. The connections between the channels in the roof battens and the roof tiles are subject to practically no stress, so that also the demands on the sealing of the connections are small, especially the heat carrier medium can flow through the roof tiles with very little pressure.

Preferably plug connections serve as inlets and outlets for the heat carrier and consist of plugs arranged on the roof tiles or on the roof battens and of openings arranged on the counterparts. The sub-structure is made by erection of the joists in the usual manner, and the roof battens fastened on to this. Accordingly the roof tiles are placed on the roof battens whereby, if necessary, additional known means of construction against wind pressure, drafts and shearing strain can be provided.

In further preferable arrangement, the channels on the upper side of a corresponding ledge of one of the lengths of the roof batten are embedded with insulating material, e.g. plastic. The channels can be injection-formed as separate parts with the plastic or also chipped out of the plastic as cavities. The last form of construction permits extrusion of the plastic ledge.

In place of the previously described solution, a variation is also possible, with which the roof batten has only one channel, while the roof tile, on the other hand, has an inlet and an outlet. The channel is then sealed between the inlet and outlet of the roof tile, so that the heat carrier medium flows through the roof batten in only one direction and thus, in turn, is led off into the roof tiles which are assigned to this roof batten. At the end of the roof batten the warmed-up heat carrier medium is fed into the next roof batten and flows through this, respectively its supporting roof tiles in the reverse direction. This movement direction of the heat carrier recommends itself especially with smaller roof surfaces.

According to a further aspect of the invention, the roof tile has an outer supporting body to be fixed on to the roof batten, made from insulating material of which the upper side holding the solar collector is inclined towards the direction of the solar irradiation.

Through this measure the upper surface of the roof tile no longer lies in the plane of the roof slant, but is tilted out of this plane, and, indeed, to such an extent that it lies in a favourable position in relation to the solar irradiation angle. It is, therewith, not only possible to utilize the solar energy on roof surfaces facing south, but also on roof surfaces facing in other directions. Even on north-facing roofs a certain amount of the solar irradiation can still be used.

Moreover, the upper side of the roof tile, especially the transparent cover lying over the solar collector, can be constructed flat or also rippled or respectively dome-shaped, in order, in this way, to achieve still a certain lens effect.

The invention will now be described further, by way of example only, with reference to the accompanying drawings in which.

Figure 1:
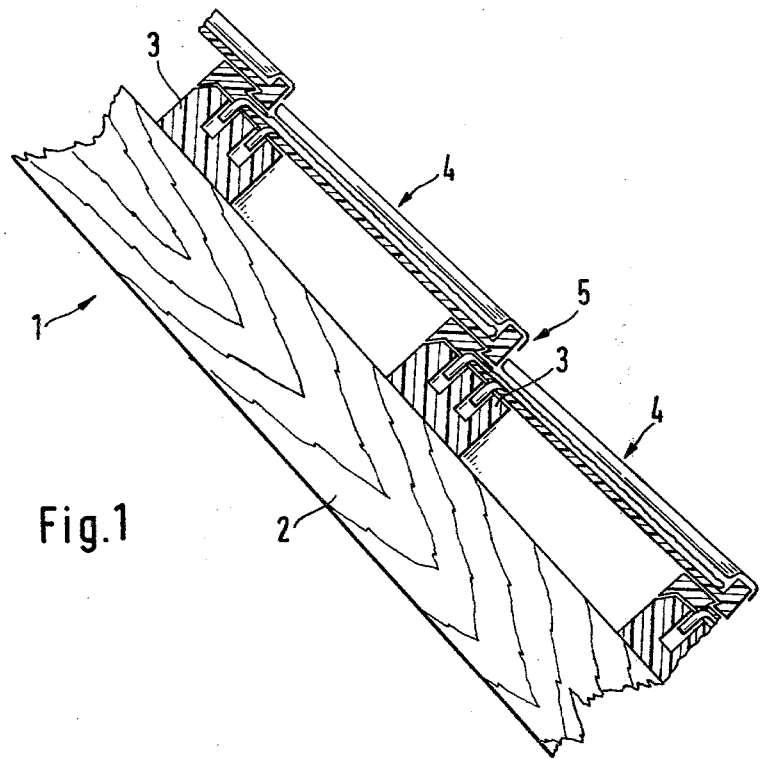
FIG. 1 is a vertical section through a part of a roof constructed in accordance with the invention.

Referring now to FIG. 1, a part of a building roof generally designated by the reference numeral 1 is shown in section, such roof comprising a conventional supporting under-construction 2 and roof battens 3 fastened thereon. Roof tiles generally designated by the reference numeral 4 are mounted on the roof battens 3, such tiles 4 being arranged in overlapping disposition in the area generally designated by the reference numeral 5 of the roof battens 3.

Figure 2:
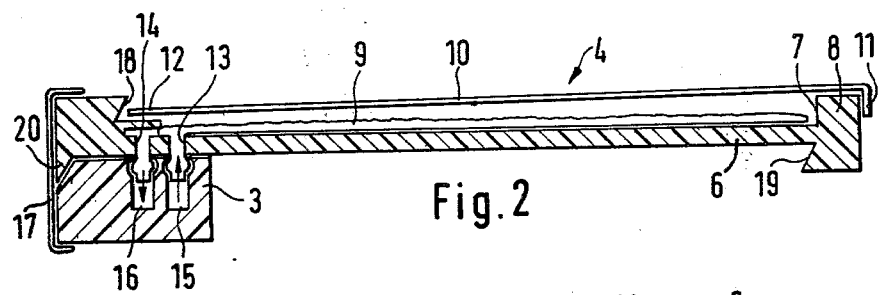
FIG. 2 shows a part of the arrangement of FIG. 1 drawn to a larger scale.

In FIG. 2 a roof tile 4 is shown to a larger scale. It consists of a supporting body 6, manufactured, for example, from rigid polyurethane foam and having, in the upper face, a cavity 7 which occupies approximately the whole surface of the roof tile 4 with the exception of a peripheral rim 8. A solar collector 9 is provided in the cavity 7, such collector having a heat carrier medium arranged in fluid-flow relationship thereto. The solar collector 9 can have any chosen customary construction and may be formed, for example, from pipes laid in coils, from double-walled cushions or similar. The solar collector 9 is covered with a transparent covering 10, of plastic, glass or foil. Three flanges of the cover are inverted over the rims 8 of the supporting body 6, while the roof batten adjoining rim 12 is, by way of example, inserted into a groove of the supporting body and is secured therein.

The solar collector 9 has, for the heat carrier medium, an inlet 13 in the form of a short feed-pipe and an outlet 14, likewise in the form of a short feed-pipe. The heat carrier medium is fed to the solar collector 9 via parallel inlet and outlet channels 15, 16 in the batten 3. The roof batten 3 is fabricated from, for example, a synthetic plastics material such as rigid polyurethane foam, and can, for example, be of extruded form, the channels 15 and 16 being formed in such extrusion process. Inlet and outlet openings can subsequently be provided in a simple manner.

The roof tile 4 is connected advantageously with the roof batten 3 by means of a clamp 17. Instead of this, however, other forms of connecting means can be provided. In order to protect the roof tile 4 adequately against the wind forces and the like, the rim 8 of the roof tile can be undercut. Thus, as is shown in FIG. 2, the supporting body 6 of the roof tile 4 has, on its upper side and in the area of the roof batten 3, an undercut 18 and in the area lying opposite thereto and at the underside, an undercut 19. These engage one another on assembly of a roof therefrom as a type of keying. Furthermore, the supporting body 6 of the roof tile 4 may be provided with a projection 20 for engagement with a complementary bevel on the roof batten 3 thereby to hold the tile relative to the batten against gravitational forces.

Figure 3:
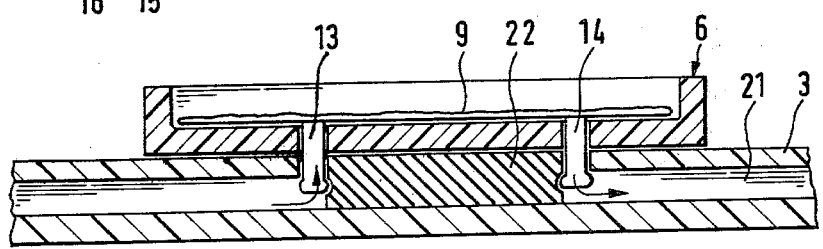
FIG. 3 shows an alternative form of roof batten in longitudinal section.

In the example shown in FIG. 3, the roof batten 3 simply has a channel 21 which is passed through in one direction by the heat carrier medium. The roof tile 4 possesses again, however,—as in the example according to FIG. 2—an inlet 13 and an outlet 14, each in the form of a short feed pipe which engages the channel 21 as a type of plug connection. The channel 21 is closed between the inlet pipe 13 and the outlet pipe 14 with a stopper 22, in order to avoid a short-circuit flow. Otherwise, the construction of the roof tile 4 is the same as described with regard to FIG. 2.

Figure 4:
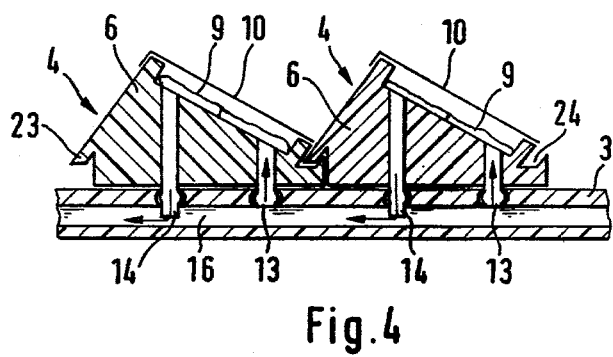
FIG. 4 shows an alternative form of roof tile to that of FIGS. 1 and 2, the tile being shown in section and the line of section being longitudinal of the roof battens.

FIG. 4 is a section similar to FIG. 3 and shows an arrangement wherein inlets and outlets for the heat carrier medium are provided in like manner to the embodiment of FIG. 2. The roof batten 3 thus has an outlet channel 16 and an inlet channel, not shown, lying behind it. Each roof tile 4 comprises a supporting body 6, a solar collector 9 and a transparent cover 10. Further, the solar collector 9 has an inlet 13 and an outlet 14.

In this embodiment, however, the upper side of the supporting body 6 is inclined outwards in relation to the plane of the roof, so that the solar collector 9 and the transparent cover 10 are correspondingly inclined. The inclination is carried out in the direction of the solar irradiation in order to utilize this better. The roof tiles 4, with bevelled surface as shown in FIG. 4, are especially used for such roof surfaces as do not face south.

Additionally to the fixing shown in FIG. 2, the supporting bodies 6 of the roof tiles 4 can also be coupled together laterally by co-operating projections 23 and cavities or recesses 24 as a type of keying.

Figure 5:
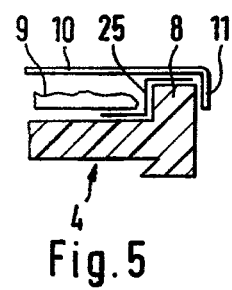
FIG. 5 is a detail section through a further form of the roof tile.

FIG. 5 shows a modified form of the roof tile shown in FIG. 2. The tile according to FIG. 5 differs in that a reflector foil 25 is inserted in the rim area between the transparent cover 10 and the solar collector 9, such reflector foil serving to reflect heat outwardly in order, for example, to thaw snow lying on the roof surface, at least in part, and to cause the snow to slide off.

Figure 6:
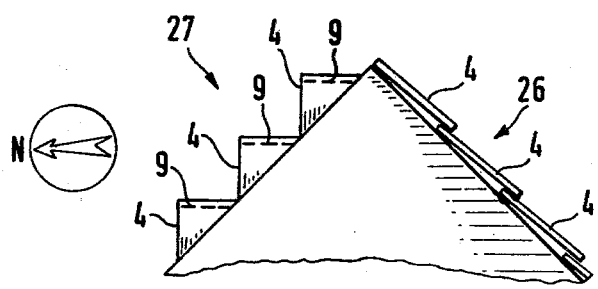
FIG. 6 is a schematic section through a gable roof.

In FIG. 6 a section of a symmetrical gable roof is shown, the south-facing roof surface generally designated by the reference numeral 26 thereof being covered with roof tiles 4 according to FIGS. 1 to 4. The roof surface generally designated by the reference numeral 27 facing north, on the other hand, is covered with roof tiles, the outer supporting body of which forms an almost equilateral triangle, so that the solar collectors 9, indicated by dotted lines, are arranged approximately horizontally, so that, in spite of the fact that the roof surface faces north, solar energy falling thereon at an incline is still utilized. According to the exact position in the northerly direction, the upper side can also still be inclined from the vertical to the plane fixed by the drawing plane.

Figure 7:
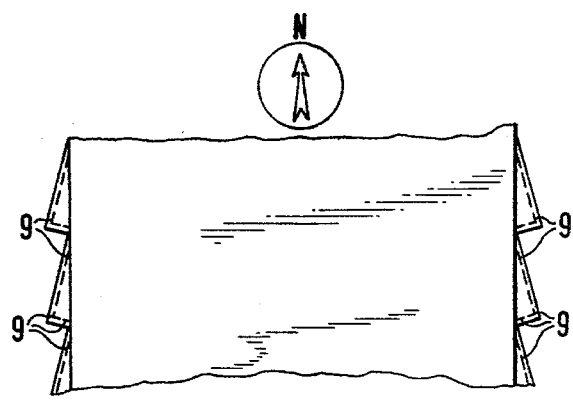
FIG. 7 illustrates a further schematic horizontal section through a gable roof.

FIG. 7 shows a horizontal section through a gable roof, whereby the outer supporting body of the roof tiles is again constructed in triangular section, in this case, of course, of less pronounced section than with the example of FIG. 6. The solar collectors 9, shown dotted, can be provided not only on the west- and east-facing larger surfaces, but especially also on the smaller south-facing surfaces.

The invention is not limited to the exact features of the embodiments hereinbefore described since alternatives will readily present themselves to one skilled in the art.

Thus, while the invention is disclosed in the context of a building roof, analogous solar heating structures may be provided in the walls of buildings and in this specification and the appended claims the term 'building roof' is to be so construed as to include wall structures, battens being applied to the wall to receive the tiles (or other cladding panels) when the invention is applied to the context of walls.

What is claimed is:

1. A building roof which includes a support structure, roof tiles, and roof battens disposed on the support structure for mounting the roof tiles, the roof tiles including a cavity and a solar collector means arranged in the cavity adapted to be traversed by a heat carrier medium, characterized in that the solar collector means further includes inlet means and outlet means for conveying the heat carrier medium to and from the solar collector means, channel means are provided in each roof batten for delivering the heat carrier medium to the inlet means and receiving the heat carrier medium from the outlet means of the solar collector means, said channel means including a portion extending parallel to the inlet means and outlet means of the solar collector means, each roof tile having a supporting area for supporting the same at the roof batten, and in that the inlet means and outlet means for the solar collector means are disposed in the supporting area and are adapted to be joined with the channel means of the roof battens.

2. A building roof according to claim 1, characterized in that the inlet means and the outlet means of the solar collector means include plug connectors cooperable with connecting means arranged on the roof tiles and the roof battens respectively.

3. A building roof according to claim 2, characterized in that the plug connectors serve, at the same time, for fixing the roof tiles to the roof battens.

4. A building roof according to claim 1, characterized in that the channel means undertake at least a supporting function for the roof tiles.

5. A building roof according to claim 1, characterized in that the channel means are embedded with an insulating material on the upper side of a ridge of one length of the roof battens.

6. A building roof according to claim 1, characterized in that said channel means includes a single channel arranged in each batten, the inlet means and outlet means are respectively constructed as one inlet and outlet connecting with the single channel, and in that means are arranged in said single channel for isolating the inlet from the outlet of the solar collector means.

7. A building roof according to claim 1, characterized in that the roof tile further includes an outer supporting body constructed of an insulating material affixed to the roof batten, and in that the solar collector means is disposed on an upper side of the outer supporting body and is arranged so as to slope in a direction of solar irradiation.

8. A building roof according to claim 7, characterized in that the outer supporting body has an essentially triangular cross-sectional configuration.

9. A building roof according to claim 7, characterized in that each of the supporting bodies includes projections and recesses provided at opposite ends thereof, said projections and recesses being arranged such that a projection of one supporting body is adapted to be accommodated in a recess of an adjacent supporting body so as to couple the supporting bodies to each other.

10. A building roof according to claim 9, characterized in that a transparent cover is arranged on each of the supporting bodies on an upper side thereof.

11. A building roof according to claim 10, characterized in that the outer supporting body has an essentially triangular cross-sectional configuration.

12. A building roof according to claim 1, characterized in that a first undercut portion is provided on an upper side of each of the roof tiles in the supporting area, and in that a complementary undercut portion is provided on an underside of each of the roof tiles at a position opposite the supporting area.

13. A building roof according to claim 1, characterized in that a reflecting foil is arranged between the roof tile and the solar collector means in a boundary area of each of the roof tiles.

14. A building roof according to claim 1, characterized in that an upper surface of the roof tile is uneven.

15. A building roof according to claim 1, characterized in that each roof tile is provided with a projection in the supporting area thereof which is adapted to cooperate with a complementary bevel provided on the roof batten so as to hold the respective roof tiles relative to the roof batten.

16. A building roof according to claim 1, characterized in that a transparent cover is arranged on an upper side of each of the roof tiles.

17. A building roof according to claim 16, characterized in that a reflecting foil is arranged between the roof tile and the solar collector means in a boundary area of each of the roof tiles.

* * * * *